United States Patent
Inagaki et al.

(10) Patent No.: US 9,539,675 B2
(45) Date of Patent: Jan. 10, 2017

(54) METHOD FOR MANUFACTURING MACHINED PART, AND MACHINED PART

(75) Inventors: Koji Inagaki, Toyota (JP); Masahiko Mitsubayashi, Nagoya (JP); Takaaki Kanazawa, Nisshin (JP); Hiroyoshi Tawa, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 154 days.

(21) Appl. No.: 14/382,946

(22) PCT Filed: Mar. 5, 2012

(86) PCT No.: PCT/JP2012/055561
§ 371 (c)(1),
(2), (4) Date: Sep. 4, 2014

(87) PCT Pub. No.: WO2013/132575
PCT Pub. Date: Sep. 12, 2013

(65) Prior Publication Data
US 2015/0075003 A1 Mar. 19, 2015

(51) Int. Cl.
*B23P 15/14* (2006.01)
*B23F 17/00* (2006.01)
(Continued)

(52) U.S. Cl.
CPC ............... *B23P 15/14* (2013.01); *B23F 17/00* (2013.01); *C21D 7/06* (2013.01); *C21D 9/32* (2013.01);
(Continued)

(58) Field of Classification Search
CPC ..... B21D 53/28; B21D 53/261; B21D 53/264; B21K 1/30–1/305; B21K 1/32; B21K 1/42; B23F 17/00; B23P 15/14; C21D 9/32; C21D 2211/006; C21D 7/06; C21D 8/005; C21D 2221/00–2221/10; C21D 2261/00; F16H 55/06; Y10T 29/49462; Y10T 29/49467; Y10T 29/49476; Y10T 29/49478; Y10T 29/4948; Y10T 29/49453; Y10T 29/49481–29/49483; Y10T 29/49504
See application file for complete search history.

(56) References Cited

U.S. PATENT DOCUMENTS 4,233,720 A * 11/1980 Rozmus ............... B22F 3/1208
                                                               419/26
4,885,831 A    12/1989 Fett
(Continued)

FOREIGN PATENT DOCUMENTS

JP    62-253723 A    11/1987
JP    07-316647 A    12/1995
(Continued)

OTHER PUBLICATIONS

Partial Translation of Written Opinion Issued to PCT/JP2012/055561.

*Primary Examiner* — Christopher Besler
*Assistant Examiner* — Matthew P Travers
(74) *Attorney, Agent, or Firm* — Sughrue Mion, PLLC

(57) ABSTRACT

[Task] To provide a method that makes it possible to easily, inexpensively and accurately manufacture a machined part with a simple configuration and an excellent strength.
[Means for Solution] In a method for manufacturing a machined part according to the invention, a dislocation is partially introduced (S3), through shot peening, only into a surface layer of a raw material 1 in a region 1a to be machined, graphite is partially deposited (S4), through heating, only in the surface layer of the region 1a to be machined, and then, the surface layer of the region 1a where graphite is deposited is removed, through machining (S5), (Continued)

only by an amount corresponding to a working margin 1c, thereby manufacturing a machined part 1'.

8 Claims, 3 Drawing Sheets

(51) Int. Cl.
    *C21D 7/06*     (2006.01)
    *F16H 55/06*     (2006.01)
    *F16H 55/17*     (2006.01)
    *C21D 9/32*     (2006.01)
    *C21D 8/00*     (2006.01)

(52) U.S. Cl.
    CPC .............. *F16H 55/06* (2013.01); *F16H 55/17* (2013.01); *C21D 8/005* (2013.01); *C21D 2211/006* (2013.01); *C21D 2221/00* (2013.01); *C21D 2261/00* (2013.01); *Y10T 29/4948* (2015.01); *Y10T 29/49462* (2015.01); *Y10T 29/49467* (2015.01); *Y10T 29/49476* (2015.01); *Y10T 29/49478* (2015.01)

(56) References Cited

U.S. PATENT DOCUMENTS

| | | | |
|---|---|---|---|
| 6,075,701 A | * | 6/2000 | Ali ...................... H01L 23/3732 |
| | | | 174/252 |
| 6,390,924 B1 | | 5/2002 | Yoshida et al. |
| 9,064,852 B1 | * | 6/2015 | Hardesty ............. H01L 21/4871 |

FOREIGN PATENT DOCUMENTS

| | | |
|---|---|---|
| JP | 09-025540 A | 1/1997 |
| JP | 09-279300 A | 10/1997 |
| JP | 2000-204432 A | 7/2000 |
| JP | 2005-273010 A | 10/2005 |

\* cited by examiner

METHOD FOR MANUFACTURING MACHINED PART, AND MACHINED PART

TECHNICAL FIELD

The invention relates to a method for manufacturing a machined part, and to the machined part. In particular, the invention relates to a method for manufacturing a machined part, for example, a gear, a pulley shaft for a continuously variable transmission (hereinafter referred to as a CVT shaft) or the like, by machining a predetermined region of a raw material, and to the machined part manufactured according to this method.

BACKGROUND ART

As a conventional art for manufacturing a machined part, as shown in FIG. 6, a machined part 100' is generally manufactured by hot-forging a raw material 100 (S12), cold-forging this raw material 100 to introduce a dislocation into an entirety thereof and form a graphite deposition nucleus (S13), performing a graphitization treatment for depositing graphite over the entire raw material 100 by maintaining a state of being heated to a predetermined temperature for a predetermined time (S14), then machining a predetermined region 100a, such as molding a gear etc. through the formation of a tooth space by, for example, cutting or the like (S15), and heating this region to the predetermined temperature for the predetermined time to solidly re-dissolve graphite (S16). A material that allows graphite to be deposited through the graphitization treatment is preferred as a raw material for manufacturing this machined part 100'. By depositing graphite through the graphitization treatment, the concentration of carbon in the raw material becomes relatively low. Therefore, the machinability at the time of machining can be enhanced.

Besides, as another conventional art, Patent Document 1 is known. Patent Document 1 relates to a steel product for a mechanical structure that is excellent in cold workability, and to a method for manufacturing the steel product. Patent Document 1 discloses performing cold working with a suitable reduction of area after hot working, splitting layers of cementite, introducing a strained dislocation as a deposition nucleus of graphite, and homogeneously, finely and swiftly depositing graphite through a subsequent annealing treatment, etc. (0025).

RELATED ART DOCUMENT

Patent Document

Patent Document 1: Japanese Patent Application Publication No. 9-279300 (JP-9-279300 A)

SUMMARY OF THE INVENTION

Problems to be Solved by the Invention

However, in the conventional art shown in FIG. 6, the dislocation is introduced into the entire raw material 100 through cold forging (S13) to form the graphite deposition nucleus, and the entire raw material 100 is heated at a predetermined temperature for a predetermined time in a furnace or the like. Therefore, the time required for the graphitization treatment (S14) is long, and the cost for facilities is also required, so that there is an obstacle in putting this art into practical use. Furthermore, the hardness is low with graphite remaining deposited in the raw material 100 through the graphitization treatment (S14). Therefore, the conventional art shown in FIG. 6 makes it necessary to dissolve graphite into the raw material and return the concentration of carbon in the entire raw material to the state prior to the deposition of graphite, by performing the process of solid re-dissolution (S16) after machining (S15). Besides, in order to sufficiently solidly re-dissolve graphite, the heating temperature, heating time and the like of the raw material 100 are too complicated to manage, and facilities, labor and time are required for this process of solid re-dissolution (S16). Therefore, there are problems of high cost and the like.

Besides, as shown in FIG. 6, vacancies remain at locations where graphite was present, due to solid re-dissolution (S16) of the graphite deposited in the entire raw material. There is a problem in that the strength of the machined part 100' decreases due to these vacancies.

Besides, in Patent Document 1 as well, a dislocation as a graphite deposition nucleus is introduced into the entire raw material through cold forging, and the entire material is heated. Therefore, there is a problem in that the time for performing the graphitization treatment cannot be shortened. There is also a problem in that a high cost is inevitable due to the necessity for relatively large facilities such as a cold forging facility for the graphitization treatment, a heating furnace and the like.

The invention has been made in view of the aforementioned problems. It is an object of the invention to provide a method that makes it possible to easily, inexpensively and accurately manufacture a machined part having a simple configuration and an excellent strength.

Besides, the invention has been made in view of the aforementioned problems. It is another object of the invention to provide a machined part that has a simple configuration and an excellent strength and can be manufactured easily, inexpensively and accurately.

Means for Solving the Problems

In order to achieve the aforementioned object, a method for manufacturing a machined part according to the invention is a method for manufacturing a machined part by machining a predetermined region of a raw material, characterized by introducing a dislocation into the region to be machined before carrying out the machining, and partially depositing graphite in the region through heating.

Besides, in order to achieve the aforementioned object, a machined part according to the invention is a machined part that is manufactured by machining a predetermined region of a raw material, characterized in that a dislocation is introduced into the region to be machined, that graphite is partially deposited in the region through heating, and that the region where graphite is partially deposited is machined.

Effects of the Invention

In accordance with the invention according to claim 1 of the present application, the dislocation is introduced into the raw material in the predetermined region to be machined, this raw material is heated to partially deposit graphite in this region, and then, this region is molded into a predetermined shape and removed through machining. Since graphite is deposited in the region to be machined, the region can be easily molded into the predetermined shape through machining. Moreover, since the region where graphite is deposited is removed through machining, no vacancy remains in the machined part due to the deposition of graphite, and there is no need to solidly re-dissolve the deposited graphite as in the case of the conventional art. Accordingly, it is possible to provide a method that makes it possible to easily and inexpensively manufacture a machined part with an excellent strength.

In accordance with the invention according to claim 9 of the present application, owing to a simple configuration in which the dislocation is introduced into the predetermined region to be machined, graphite is partially deposited in the region to be machined, this region is machined and molded into the predetermined shape, and the deposited graphite is removed, it is possible to provide a machined part that has an excellent strength and can be manufactured easily and inexpensively.

MODES FOR CARRYING OUT THE INVENTION

Figure 1:
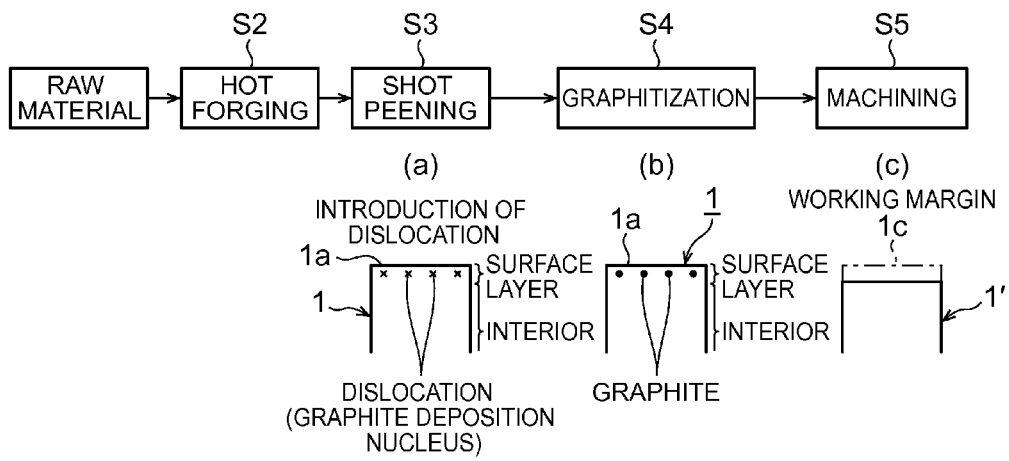
FIG. 1 includes a block diagram showing one embodiment of processes of a method for manufacturing a machined part according to the invention, and an illustrative view of a raw material in the respective processes.

First of all, the basic configuration of a method for manufacturing a machined part according to the invention will be described in detail on the basis of FIG. 1. Incidentally, like reference symbols denote like or equivalent regions respectively in the drawings.

The method for manufacturing the machined part according to the invention is generally designed to machine a predetermined region 1a of a raw material 1. In this method, a dislocation is introduced (S3) into the region 1a to be machined before machining (S5) is carried out, and graphite is partially deposited (S4) in the region 1a to be machined, through heating. Incidentally, this embodiment of the invention will be described with reference to a case where shot peening is carried out in order to introduce the dislocation into the region 1a to be machined.

The raw material 1 is molded into a cylindrical or rod-like shape (the cylindrical shape is used as a collective term for the rod-like shape as well in the invention) with a predetermined diameter. For example, it is possible to use a raw material where graphite is deposited through a graphitization treatment with 0.3 to 0.8 weight % of carbon (C). In manufacturing a machined part 1' through the use of this raw material 1, in this embodiment of the invention, the cylindrical raw material 1 is first heated to a predetermined temperature, and is pre-molded through hot forging (S2) into a shape close to the shape of the machined part to be manufactured, as shown in FIG. 1.

Subsequently, the pre-molded raw material 1 is subjected, only in the region 1a to be machined later, to shot peening for projecting a projection material having a predetermined particle diameter. Thus, as indicated by (a) of FIG. 1, a residual stress (a strain) is produced partially and only in a surface layer of the raw material 1 in the region 1a to be machined later, and a dislocation as a graphite deposition nucleus is introduced thereinto. The depth to which the dislocation is introduced into this raw material 1 can be arbitrarily set, for example, to about 0.2 to 0.4 mm from the surface. In this manner, the depth to which the dislocation is introduced can be adjusted by appropriately changing the particle diameter, hardness, projection pressure, or coverage of the projection material for shot peening.

Subsequently, the raw material 1 that has been subjected to shot peening is heated at a predetermined temperature for a predetermined time, and the region 1a into which the dislocation has been introduced is subjected to a graphitization treatment for depositing graphite (S4). As described above, the dislocation as the graphite deposition nucleus is partially introduced only into the surface layer of the raw material 1 in the region 1a to be machined. Therefore, as indicated by (b) of FIG. 1, graphite is also partially deposited only in the surface layer of the region 1a to be machined later.

After that, the predetermined region 1a of the raw material 1 subjected to the graphitization treatment is subjected to, for example, cutting or the like (S5). Thus, as indicated by (c) of FIG. 1, since graphite is deposited in the raw material 1 in the region 1a to be machined, this region 1a exhibits good machinability. Besides, the deposited graphite is removed through machining, and hence does not remain in the machined part 1' as a product. Accordingly, the process of solid re-dissolution (S16) in the conventional art is unnecessary, so that removal machining such as cutting or the like can be carried out inexpensively, easily and accurately.

Incidentally, the invention is not limited to the aforementioned embodiment thereof. In order to introduce the dislocation into the surface layer of the raw material 1 in the region 1a to be machined, a method other than shot peening may be adopted. For example, by subjecting the raw material 1 to cold serial machining, CBN cutting or the like in the predetermined region 1a to be machined, plastic flow of the surface of the raw material in the predetermined region 1a to be machined can be caused to produce a residual stress as well. In cold serial machining, a contact pressure is sequentially applied to the predetermined region 1a in a cold state. In CBN cutting, a contact pressure is applied to the surface of the region 1a of the raw material while this surface is cut to be pre-molded, with the aid of a cubic boron nitride sintered compact (a CBN sintered compact). Besides, in the method according to the invention, hot forging (S2 in FIG. 1) can be carried out if necessary. However, this process S2 is not indispensable, and can be omitted.

Figure 6:
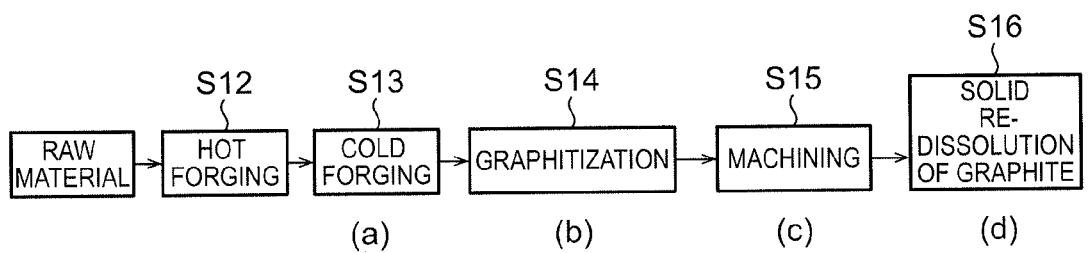
FIG. 6, includes a block diagram showing one embodiment of processes of a method for manufacturing a machined part according to the conventional art, and an illustrative view of a raw material in the respective processes.
Figure 6:
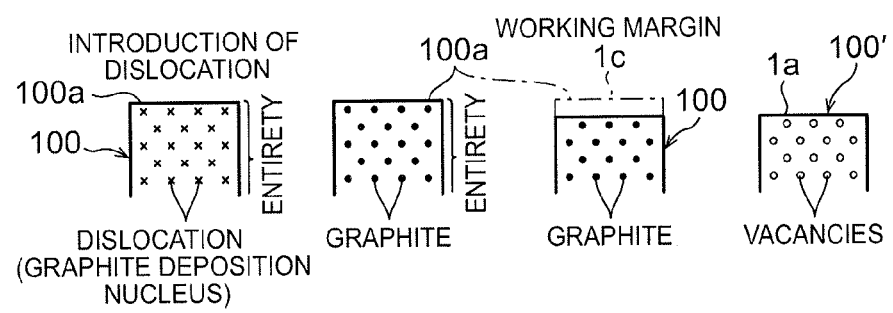

Next, an experimental example for making a comparison between the fatigue strength of the machined part manufactured according to the method of the invention configured as described above and the fatigue strength of the machined part manufactured according to the conventional art (see FIG. 6) will be described on the basis of FIG. 2 and FIG. 3.

Figure 2:
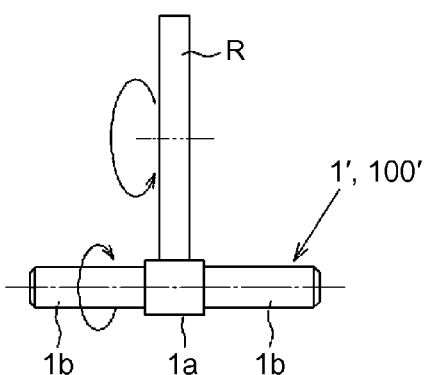
FIG. 2 is an illustrative view showing a roller pitching test as a fatigue strength test.
Figure 3:
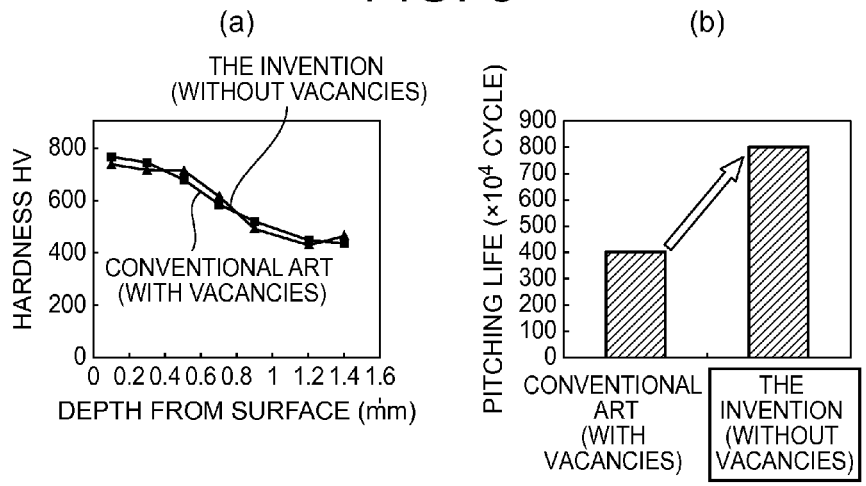
FIG. 3 includes graphs showing a result of (a) a distribution of hardness with respect to the depth from a surface, and a result of the roller pitching test shown in FIG. 3, as to a sample manufactured on the basis of the invention and a sample manufactured according to the conventional art.

In a roller pitching test shown in FIG. 2, each of a sample 1' of the machined part manufactured according to the invention and a sample 100' of the machined part manufactured according to the conventional art is molded such that a central evaluation portion thereof (which is equivalent to the region to be machined) 1a has a diameter of 26 mm and an axial length of 28 mm, and that shaft portions 1b thereof have a diameter of 24 mm at both ends and an axial length of 51 mm. The shaft portions 1b of each of these samples were pivotally supported, and a large roller R with a diameter of 130 mm was pressed against the evaluation portion 1a at a contact pressure of, for example, 200 to 3000 Mpa to cause rotation around an axis. Then, the number of rotations was checked until each of the samples 1' and 100' was damaged due to fatigue.

Before conducting the roller pitching test, a distribution of the hardness with respect to the depth from the surface of each of the sample 1' manufactured according to the invention and the sample 100' manufactured according to the conventional art was measured. As a result, as indicated by (a) of FIG. 3, it has been revealed that the distribution of the hardness with respect to the depth from the surface is substantially identical in the sample 1' manufactured according to the invention and the sample 100' manufactured according to the conventional art. Then, the result obtained by conducting the roller pitching test using these samples 1' and 100' has revealed that the pitching life of the sample (the invention) 1' manufactured according to the invention is about twice as long as the pitching life of the sample (the conventional art) 100' manufactured according to the conventional art, as indicated by (b) of FIG. 3. This proves that the invention makes it possible to obtain the same hardness distribution as in the conventional art, and manufacture the machined part 1' with an excellent pitching strength.

In this manner, the machined part 1' according to the invention is manufactured by introducing the dislocation into the region 1a, partially depositing graphite in the region 1a through heating, and removing, through machining, this region 1a where graphite is partially deposited. Thus, the machined part 1' that has been machined as the product according to the invention does not induce the creation of vacancies inside through solid re-dissolution of graphite as in the case of the conventional art, and consequently, has the same hardness distribution as in the conventional art, and a more excellent fatigue strength than in the conventional art. Besides, when machining is carried out, graphite is deposited in the predetermined region 1a of the raw material 1, so that this region 1a is easily and accurately machined. Furthermore, the process of solid re-dissolution (S16) in the conventional art is made unnecessary by removing the region 1a where graphite is deposited. It is therefore possible to realize a configuration in which the machined part 1' can be manufactured inexpensively and easily.

Next, a more specific embodiment of the invention will be described mainly on the basis of FIG. 4, with reference to a case where a machined part 10' having a geared tooth G that has a tooth mark 10g' formed in a predetermined region 10a of a raw material 10 is manufactured. Incidentally, configurational details identical or equivalent to those in the foregoing description are denoted by the same reference symbols respectively, and will not be described below. Only configurational details different from those described above will be described.

In general, in a method for manufacturing the machined part 10' according to this embodiment of the invention, a gear-shaped tooth mark 10g is pre-molded from the cylindrical raw material 1 through hot forging, a dislocation is introduced into a surface layer of this pre-molded tooth mark 10g, graphite is deposited in the surface layer of the pre-molded gear-shaped tooth mark 10g through heating, and the surface layer where graphite is deposited is removed to form a tooth space by machining the tooth mark 10g, so that the tooth mark 10g' of the geared tooth G is molded.

In manufacturing the machined part 10' having the geared tooth G, the cylindrical raw material 10 having the predetermined diameter is first prepared (see S1 of FIG. 1). Then, the tooth mark 10g is pre-molded such that the region where the geared tooth G is molded later through machining assumes a shape close to the shape of the tooth mark 10g' as a final product of this geared tooth through hot forging (see S2 of FIG. 1). The shape of the tooth mark 10g pre-molded at this time can be set as a shape obtained by adding a working margin (see (c) of FIG. 4) 10c to the shape of the tooth mark 10g' of the geared tooth G that is to be molded as will be described later.

Subsequently, as indicated by (a) of FIG. 4, a dislocation is introduced only into the surface layer of the pre-molded tooth mark 10g (see S3 of FIG. 1). As this introduction of the dislocation, any one of shot peening, cold serial machining, CBN cutting and the like can be adopted as described above. Besides, the depth of the surface layer to which the dislocation is introduced can be set to the depth of the working margin 10c. The pre-molded tooth mark 10g is molded in the predetermined region of the raw material 10, into a shape close to the shape of the tooth mark 10g' of the geared tooth G to be molded. Therefore, the dislocation can be introduced, to an exact depth, into the surface layers of the addendum, tooth flank, dedendum and tooth bottom of each tooth mark 10g of the geared tooth G.

Subsequently, the raw material 1 with the dislocation introduced into the surface layer of the tooth mark 10g pre-molded in the region to be machined is held at a predetermined temperature and heated to perform the graphitization treatment (see S4 of FIG. 1) for a predetermined time. Graphite is deposited only in the surface layer of the pre-molded tooth mark 10, as indicated by (b) of FIG. 4.

Figure 4:
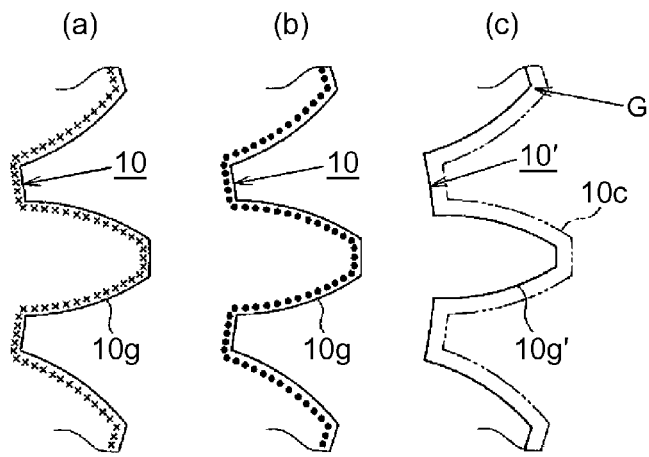
FIG. 4 includes illustrative views showing a case where a predetermined region of the raw material is machined to form a tooth mark according to the invention.

After that, a tooth space is formed through removal machining of the predetermined working margin 10c as indicated by a chain line in (c) of FIG. 4, by subjecting the pre-molded region of the raw material 1 subjected to the graphitization treatment to machining such as cutting or the like. Thus, the geared tooth G having a tooth mark 10G' of a predetermined shape is molded. In forming the tooth space through this cutting, good machinability is achieved because only the surface layer of the tooth mark 10g where graphite is deposited is removed. As a result, the tooth mark 10g' can be molded easily and accurately.

When the tooth mark 10g' of the geared tooth G is molded through machining such as cutting or the like, the hardness of the tooth mark 10g' is adjusted by subjecting the tooth mark 10g' of this geared tooth G to induction outline quenching or the like.

Next, an experimental result for making a comparison between the fatigue strength of the machined part 10' having the geared tooth G manufactured according to this embodiment of the invention configured as described above and the fatigue strength of the machined part 100' having the geared tooth G manufactured according to the conventional art (see FIG. 6) will be described on the basis of FIG. 5.

Figure 5:
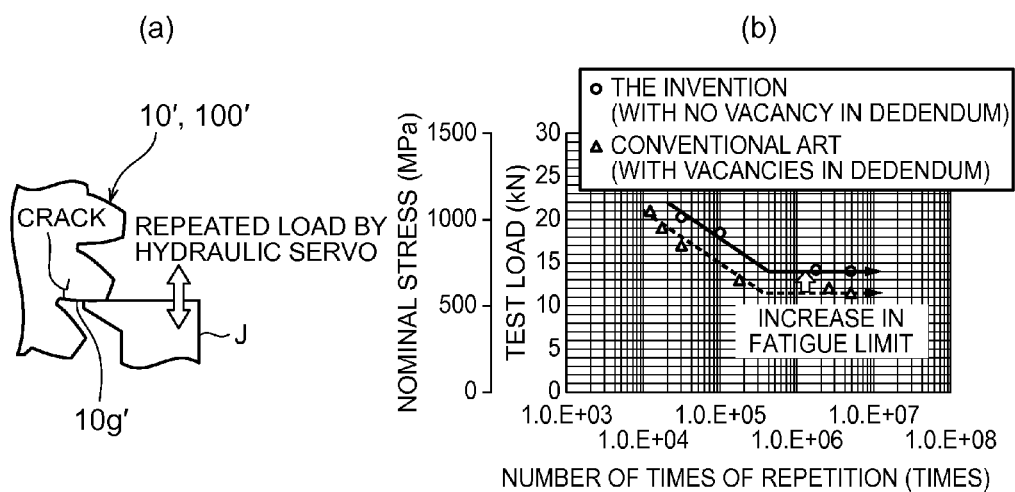
FIG. 5 includes an illustrative view (a) showing a pulsator test as a bending fatigue strength test, and a graph (b) showing a result of the pulsator test as to the sample manufactured on the basis of the invention and the sample manufactured according to the conventional art.

An illustrative view of a pulsator test is indicated by (a) of FIG. 5, as the fatigue strength of the molded tooth mark. A test result of the gear of the machined part 10' manufactured according to the invention and the gear of the machined part 100' manufactured according to the conventional art is indicated by (b) of FIG. 5. As indicated by (a) of FIG. 5, the pulsator test is designed to bring a jig J into abutment on the molded tooth mark 10g', and to apply a repeated load to the tooth mark 10g' through the use of a hydraulic servo or the like, via this jig J. The repeated load applied to this tooth mark 10g' can be set, for example, within a range where the frequency is 60 Hz and the test load is 14 to 28 kN.

In the tooth mark 10g' molded according to the invention, no graphite is deposited, and hence, no vacancy is formed as a result of a solid re-dissolution treatment. On the other hand, in the machined part 100' molded according to the conventional art, graphite is entirely deposited, and hence, vacancies are formed in the entirety including the dedendum as a result of the solid re-dissolution treatment (see (d) of FIG. 6). Due to this difference, the fatigue limit (i.e., the bending fatigue strength of the dedendum of the tooth mark 10g') of the machined part 10' according to the invention can be made higher than the fatigue limit of the machined part 100' according to the conventional art.

In this manner, the machined part 10' according to the invention is manufactured by pre-molding the tooth mark 10g from the cylindrical raw material 10 through hot forging, introducing a dislocation only into the surface layer of this pre-molded tooth mark 10g, depositing graphite only in the surface layer of the pre-molded tooth mark 10g through heating, removing, through machining, the surface layer of the tooth mark 10g where graphite is deposited to mold the tooth mark 10g', and then quenching this tooth mark 10g. Thus, the machined part 10' as the product according to the invention does not induce the creation of vacancies inside through solid re-dissolution of graphite as in the case of the conventional art, and has a martensite quenched structure due to quenching carried out after machining. Therefore, the surface of the tooth mark 10g' has a predetermined hardness, and a more excellent fatigue limit is obtained than in the conventional art. Besides, at the time of machining, excellent machinability is achieved because the surface layer of the tooth mark 10g where graphite is deposited is removed. Moreover, since there is no need to solidly re-dissolve the deposited graphite as in the case of the conventional art, the tooth mark 10g' is molded inexpensively, easily and accurately.

INDUSTRIAL APPLICABILITY

The invention is not limited to cutting as the machining of a predetermined region of a raw material, but is also applicable to cases where other types of removal machining such as grinding and the like are carried out, as long as the graphite deposited only in a surface layer of the raw material is removed. Besides, the invention is also applicable to parts other than gears, as long as these parts are each molded by machining a predetermined region of a raw material.

DESCRIPTION OF REFERENCE SYMBOLS

1: RAW MATERIAL
1a: REGION TO BE MACHINED LATER
1': MACHINED PART
10: RAW MATERIAL
10g: PRE-MOLDED TOOTH MARK
10c: WORKING MARGIN
10': MACHINED PART
10g': TOOTH MARK OF MACHINED PART
100: RAW MATERIAL IN CONVENTIONAL ART
100': MACHINED PART ACCORDING TO CONVENTIONAL ART

The invention claimed is:

1. A method for manufacturing a machined part by cutting and removing a predetermined region of a raw material through machining, comprising:
   introducing a dislocation only into the region to be machined,
   forming graphite only in the region through heating, and
   after forming graphite in the region, machining the region where the graphite is formed,
   wherein the graphite is formed from carbon existing within the raw material.

2. The method for manufacturing the machined part according to claim 1, further comprising:
   pre-molding the region before introducing the dislocation.

3. The method for manufacturing the machined part according to claim 1, further comprising:
   carrying out quenching after machining.

4. The method for manufacturing the machined part according to claim 1, wherein
   introduction of the dislocation is carried out through shot peening.

5. The method for manufacturing the machined part according to claim 4, wherein
   a depth to which the dislocation is introduced into a surface layer of the region is controlled by changing a particle diameter of a projection material for shot peening, in introduction of the dislocation.

6. The method for manufacturing the machined part according to claim 1, further comprising:
   forming a geared tooth in the region through machining.

7. The method for manufacturing the machined part according to claim 6, further comprising:
   pre-molding a cylindrical raw material through hot forging, wherein
   the region into which the dislocation is introduced is a surface layer,
   the region where graphite is formed through heating is the surface layer, and
   the region where the geared tooth is formed through machining is the surface layer.

8. The method for manufacturing the machined part according to claim 6, further comprising:
   pre-molding a cylindrical raw material into a shape of a gear through hot forging, wherein
   the region into which the dislocation is introduced is the surface layer of a tooth mark of the pre-molded gear,
   the region where graphite is formed through heating is the surface layer of the pre-molded gear-shaped tooth mark, and
   the region where the geared tooth is formed through machining is the surface layer of the pre-molded gear-shaped tooth mark.

* * * * *